United States Patent
Zhu et al.

(10) Patent No.: US 8,837,854 B2
(45) Date of Patent: *Sep. 16, 2014

(54) IMAGE PROCESSING METHOD FOR BOUNDARY RESOLUTION ENHANCEMENT

(71) Applicant: Corel Software LLC, Menlo Park, CA (US)

(72) Inventors: Lihua Zhu, Mountain View, CA (US); Haihua Wu, Mountain View, CA (US); Chung-Tao Chu, Mountain View, CA (US); Richard Hua, Mountain View, CA (US)

(73) Assignee: Corel Software, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/718,998

(22) Filed: Dec. 18, 2012

(65) Prior Publication Data

US 2013/0108186 A1 May 2, 2013

Related U.S. Application Data

(63) Continuation of application No. 12/748,058, filed on Mar. 26, 2010, now Pat. No. 8,335,394.

(30) Foreign Application Priority Data

Jan. 29, 2010 (TW) .............................. 99102602 A

(51) Int. Cl.
G06K 9/00 (2006.01)
G06T 5/00 (2006.01)

(52) U.S. Cl.
CPC ...................................... *G06T 5/003* (2013.01)
USPC ........... 382/263; 382/181; 382/199; 382/254; 382/275; 382/299

(58) Field of Classification Search
USPC .......... 382/181, 199, 254–266, 275, 299, 300
See application file for complete search history.

(56) References Cited

U.S. PATENT DOCUMENTS

| 7,418,130 B2* | 8/2008 | Keshet et al. ................. 382/162 |
| 7,466,871 B2* | 12/2008 | Hosoda et al. ................. 382/266 |
| 2008/0144959 A1* | 6/2008 | Rasch et al. ................. 382/260 |
| 2010/0253790 A1* | 10/2010 | Hayasaki ................... 348/207.2 |

* cited by examiner

*Primary Examiner* — Wesley Tucker
(74) *Attorney, Agent, or Firm* — Patterson & Sheridan LLP

(57) ABSTRACT

An image processing method for boundary resolution enhancement is disclosed. Firstly, an image is transferred into an image layer. Noise of the image layer is removed by a bilateral filter and crisp edges are retained at the same time. Moreover, the image layer is interpolated by an interpolation filter for resolution enhancement. The image processing method of the present invention can lower the image blur degree substantially, enhance the image resolution and be widely implemented in all sorts of image/video processing hardware devices.

21 Claims, 3 Drawing Sheets

IMAGE PROCESSING METHOD FOR BOUNDARY RESOLUTION ENHANCEMENT

CROSS-REFERENCED TO RELATED APPLICATIONS

This application is a continuation of U.S. patent application Ser. No. 12/748,058, filed Mar. 26, 2010, U.S. Pat. No. 8,335,394, issued Dec. 18, 2012, which claims foreign priority benefits under 35 U.S.C. §119 to Taiwan patent application serial number 099102602, filed Jan. 29, 2010. Each of the aforementioned related patent applications is herein incorporated by reference in its entirety.

BACKGROUND OF THE INVENTION

1. Field of the Invention

The present invention relates to an image processing method, and in particular to an image process method for boundary resolution enhancement which can suitable to implement in many kinds of mother boards, display cards or image processing device.

2. Description of the Related Art

Owing to the continuous development of display technology, the display screens with the old style of cathode ray tubes are gradually replaced by the flat display panels which are Liquid Crystal or Plasma. Most of these display devices have High Definition (HD) resolution ($1920^x$ 1080p), but the resolution of some video formats especially for the old broadcasting programs belongs to Standard Definition (SD) lower than High Definition resolution. Therefore, in order to maintain the display performance when the video format with Standard Definition resolution is inputted on the display device with High Definition resolution, the problem of fitting the video format for the display device has to be solved. Video upsampling method and super resolution method can be utilized to input the low resolution video format on the high definition devices. However, compared to image/video resolution up-conversion filter based methods, the super resolution method is so complicated that it requires plenty of hardware computation support than. For this reason, the most display products prefer to adopt the image/video resolution up-conversion filter based method because of low computation burden.

The image/video resolution up-conversion filter based method is capable of supporting the processing of image edges texture artifacts, and noise. The existed image/video resolution up-conversion methods comprise linear methods and non-linear methods. One of the linear methods is a bilinear interpolation method. It has low cost and reducing artifact and blurring degree of an image so the most graphic cards have integrated the bilinear interpolation into the chipset. However, the bilinear interpolation method still has strong overshoot issues on edges and boundaries, and the artifact cannot be totally removed. The non-linear methods effectively overcome the shortcomings of the linear method but the fine details are still blurring.

In the view of these above mentioned shortcomings in the prior arts, the present invention provides an image processing method for boundary resolution enhancement to transfer the low resolution image into a high resolution one for displaying on high resolution devices. The complexity of the present invention is low enough to implement it in all kinds of display devices and image/video processing hardware devices.

SUMMARY OF THE INVENTION

An objective of the present invention is to disclose an image processing method for boundary resolution enhancement which is capable of substantially decreasing trickle noise, and overshoot and artifact compression issues for reducing image blurring degree and enhancing image resolution.

Further, the complexity of the image processing method of the present invention is so low that the computation is not heavy and the present invention has great practicability because it can be implemented in central processing units, image processing chips, mother boards, display cards and digital image processing units.

To achieve the abovementioned objectives, the present invention discloses an image processing method for boundary resolution enhancement which comprises steps: transferring an image into an image layer; smoothly removing trickle noise which is small illuminance variation of the image layer and retain boundaries which is large illuminance variation to generate a resolution image layer by a bilateral filter; dividing each pixel of the resolution image layer by using data dependent triangulation, wherein each pixel has a diagonal line, the resolution image layer is divided into a plurality of horizontal blocks and vertical blocks, the resolution image layer is divided into a plurality of horizontal pixel fields and vertical pixel fields which are based on the diagonal lines, the horizontal pixel fields and the vertical pixel fields are formed through a gradient process executed by a sharpness filter for removing unbalance boundaries of the resolution image layer and generating a sharpened image layer; and center pixel points of the horizontal and vertical pixel fields and opponent pixel points relative to the center pixel points are interpolated by an interpolation filter using interpolation pixels so that a high resolution image layer is generated.

It is to be understood that both the foregoing general description and the following detailed description are exemplary, and are intended to provide further explanation of the invention as claimed.

DETAILED DESCRIPTION OF THE INVENTION

The present invention provides an image processing method for boundary resolution enhancement, which utilizes a bilateral filter to remove trickle noise of an image layer, and to retain crisp edges of the image layer. Then, a sharpness filter performs a gradient analysis of the image layer to reduce artifacts resulting in unbalance boundaries and to enhance texture and edge details. Finally, an interpolation filter is used to interpolate the image layer for increasing the image resolution. The characteristic technology of the present invention is described in the following preferred embodiment.

Figure 1:
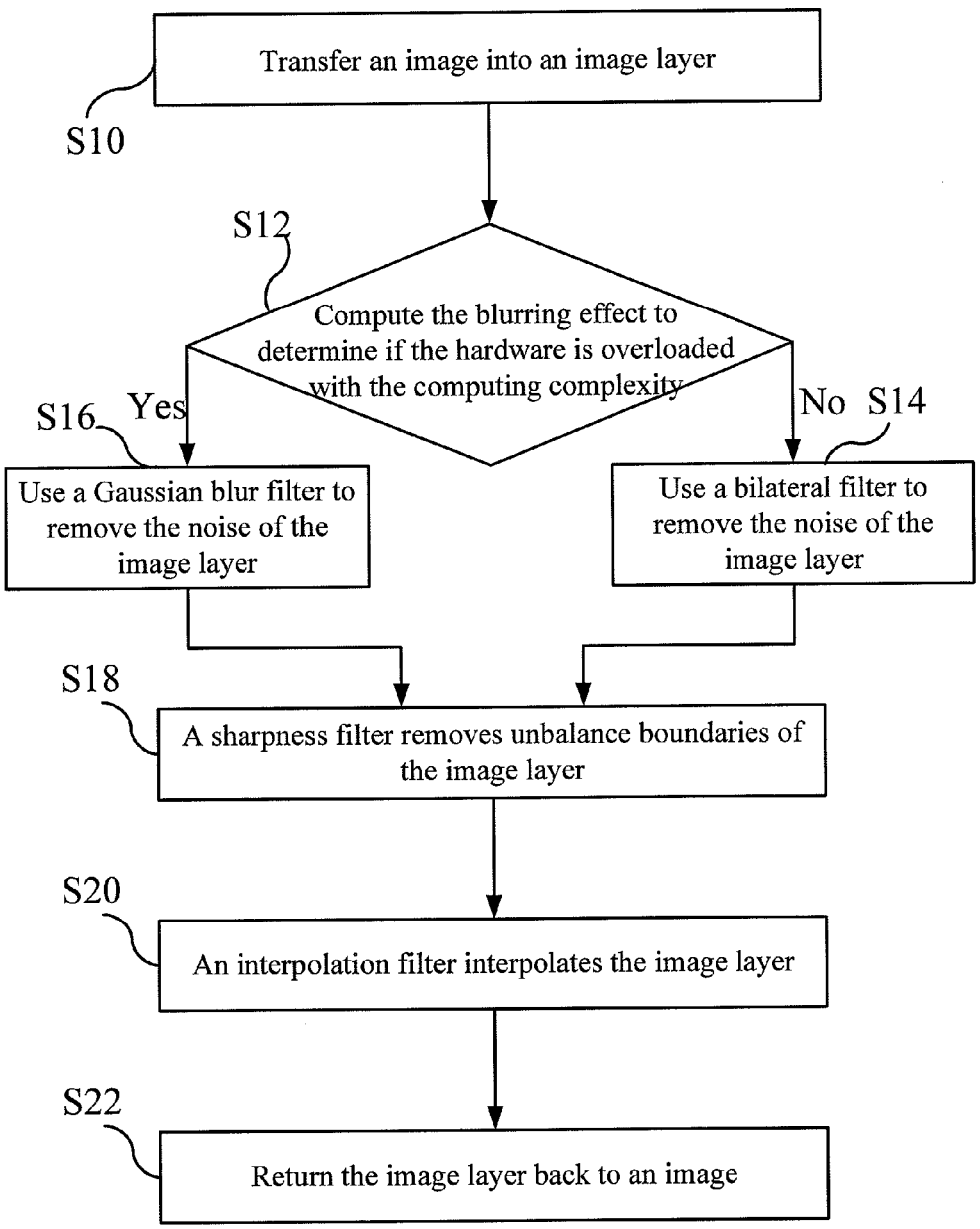
FIG. 1 is a flow chart for enhancing image boundary resolution according to the present invention.

FIG. 1 is a flow chart of the image processing method for boundary resolution enhancement according to the present invention. Firstly, in Step S10, an image is transferred into an image layer which is RGB format, YUV format, or CIE-Lab format.

Next, in Step S12, blurring effect of the image layer is computed. In light of the result of the blurring effect, the computing complexity which the image layer is filtered by the bilateral filter is predicted to determine the load of the hardware. When the hardware cannot afford the computing complexity, as shown in Step S16, the noise of the image layer is removed by an Inverted Intensity Gaussian Bilateral Filter (IIG Bilateral Filter) to generate a resolution image layer. Because some mother boards integrated with a video card or a hardware device cannot afford the complex calculation of the image layer processed by the bilateral filter, a Gaussian blurring filter will be adapted to filter the image layer so that the computing complexity of filtering can be reduced.

Then, in Step S18, use a sharpness filter to perform a gradient analysis of the resolution image layer, remove unbalance boundaries generating overshoot issues in the resolution image layer, and enhance the texture and edges details of the resolution image layer so as to generate a sharpened image layer.

Subsequently, in Step S20, the method continues with using an interpolation filter to interpolate the sharpened image layer. A high resolution image layer is subsequently generated.

Finally, in Step S22, the high resolution image layer, which is formed from the resolution image processed through the filtering, the sharpening, and the interpolating procedures, is transferred back to the original format of the image such that the high resolution image layer after transferred can be displayed with high definition resolution on display devices.

The above mentioned disclosure is the procedures of the image processing method according to the present invention. In the following, the filter design of the Inverted Intensity Gaussian Bilateral Filter and the detail illustration how the image layer is performed gradient analysis by the sharpness filter and how the image layer is interpolated by the interpolation filter will be described in detail.

The inverted intensity Gaussian bilateral filter comprises a horizontal Invert Intensity Gaussian Bilateral Filter and a vertical Invert Intensity Gaussian Bilateral Filter. The image layer is filtered horizontally by the horizontal Invert Intensity Gaussian Bilateral Filter, and then it is filtered vertically by the vertical Invert Intensity Gaussian Bilateral Filter, such that the noise of the image layer can be removed and the resolution image layer can be generated from the image layer. In order to eliminate the trickle noise and compression artifacts of the image layer effectively and at the same time maintain crisp edges. The design of the Invert Intensity Gaussian Bilateral Filter is shown in derived as the following equations:

$$B(c) = \frac{\int I(a)g(I(a), I(c))f(p(a), p(c))}{\int g(I(a), I(c))f(p(a), p(c))} \quad (1)$$

$$g(I(a) - I(c)) = C - e^{-\frac{1}{2}\left(\frac{D(I(a),I(c))}{\sigma_r}\right)^2} \quad (2)$$

$$f(I(a) - I(c)) = e^{-\frac{1}{2}\left(\frac{D(P(a),P(c))}{\sigma_r}\right)^2} \quad (3)$$

-continued $$B(c) = \frac{\int I(a)\left(C - e^{-\frac{1}{2}\left(\frac{D(I(a),I(c))}{\sigma_r}\right)^2}\right)e^{-\frac{1}{2}\left(\frac{D(P(a),P(c))}{\sigma_r}\right)^2}}{\int \left(C - e^{-\frac{1}{2}\left(\frac{D(I(a),I(c))}{\sigma_r}\right)^2}\right)e^{-\frac{1}{2}\left(\frac{D(P(a),P(c))}{\sigma_r}\right)^2}} \quad (4)$$

whereas B(.) is a pixel's intensity value, c is a pixel, a is a neighbor pixel of c, I(.) returns a pixel's intensity value of the CIE-LAB color space or RGB space, P(.) returns the position of a pixel, $f$(.) is a spatial filtering function and g(.) is an intensity filtering function, D(.) is a distance function, and c is a constant.

The above mentioned Equation (1) indicates the enhancement of intensity value of a pixel (c) can be obtained by integrating intensity domain and spatial domain of a pixel (c) itself and intensity domain and spatial domain of a neighbor pixel (a). The invert intensity Gaussian bilateral filter filters the image layer repeatedly until the intensity variation is lower than a filtering threshold or reaches zero. Equation (2) and Equation (3) represent an intensity domain variation curve of the intensity value of a reflect pixel (a) and a reflect neighbor pixel (c), and a spatial domain variation curve of the intensity value of the reflected pixel (a) and intensity value of the reflected adjacent pixel (c). Wherein, the distance function D(.) can be an Euclidean distance function, C can be set 0.004 for eight bit depth video. Equation (2) and Equation (3) are substituted into Equation (1) to generate Equation (4) which means the spatial domain and the intensity domain of the pixels are simultaneously processed with a Gaussian blurred algorithm in the image layer. The noise of small illsuminance variation is smoothly removed from the image layer and the edge of large illsuminance variation is retained in it. Subsequently, the resolution image layer is generated.

In those descriptions described above, the related equations derivations of the Invert Intensity Gaussian Bilateral Filter design are explained. The gradient analysis and interpolation procedures are further described in the following.

Figure 2A:
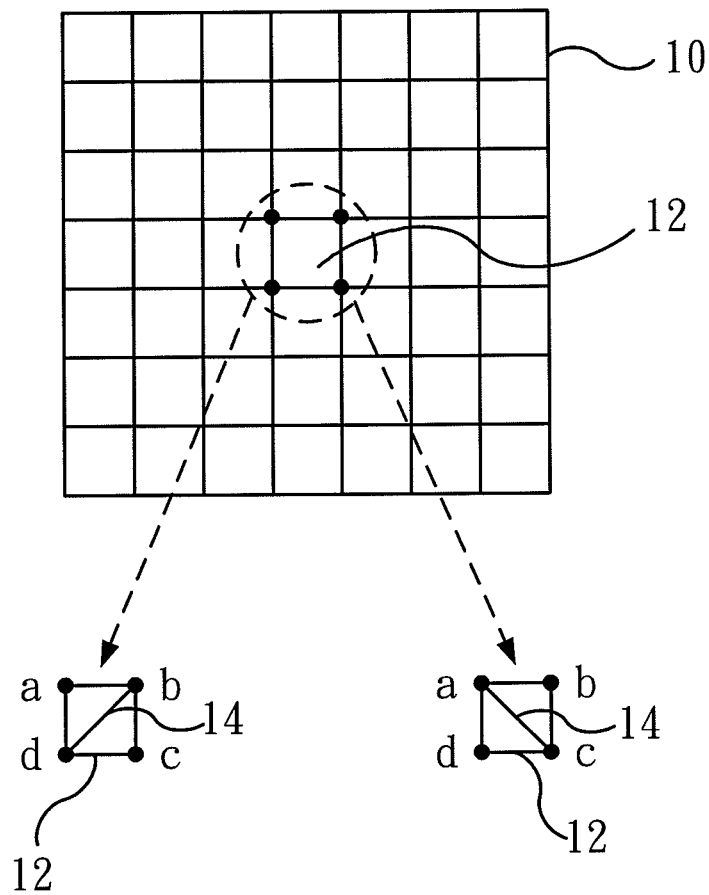
FIG. 2(a) is a diagram for pixels divided by Data Dependent Triangulation according to the present invention.
Figure 2B:
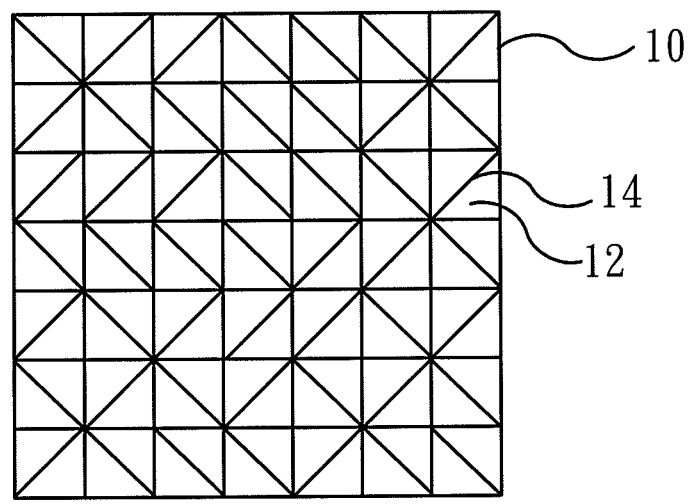
FIG. 2(b) is a diagram for a resolution image divided by Data Dependent Triangulation according to the present invention.

Refer to FIGS. 2(a) and 2(b). In the first procedure, the gradient analysis of the resolution image layer is performed by the sharpness filter, the pixels of the resolution image layer are divided by utilizing Data Dependent Triangulation (DDT) to provide each pixel with a diagonal line. Each pixel 12 of the resolution image layer 10 is represented by four points a, b, c, d. If the absolute value of subtracting point a from point c smaller than that of subtracting point b from point d$^{(if\ |a-c|<|b-d|)}$ a diagonal line 14 will be generated from point a to point c; if the absolute value of subtracting point a from point c larger than that of subtracting point b from point d$^{(if\ |a-c|<|b-d|)}$, another diagonal line 14 from b to d will be generated from point b to point d.

Figure 3A:
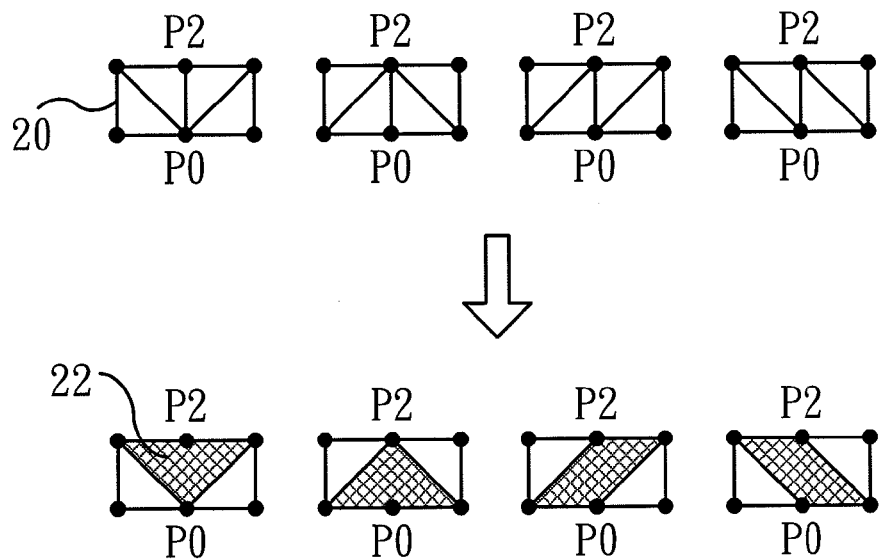
FIG. 3(a) is a diagram that the resolution image is divided into horizontal blocks and horizontal pixel fields are formed.

Then, refer to FIG. 3(a). The resolution image layer 10 is divided into a plurality of 2×2 horizontal blocks and a plurality of horizontal pixel fields 22 are formed along the diagonal line 14, so that the 2×2 horizontal pixel fields 20 become 2×3 horizontal blocks 20 and each of horizontal pixel fields 22 has a center pixel point P0 and an opponent pixel point P2 relative to the center pixel point P0. Because of the different slopes of the diagonal lines 14, the shapes of the horizontal pixel fields 22 based on the diagonal lines 14 are different. If the two adjacent diagonal lines 14 have an intersecting point, the shape of the horizontal pixel field is a triangle. If the two adjacent diagonal lines 14 are parallel to each other, the shape of the horizontal pixel fields is a quadrilateral shape. After creating the horizontal pixel fields 22, a gradient horizontal analysis are performed in the horizontal pixel fields 22 by a high pass sharpened filter.

Figure 3B:
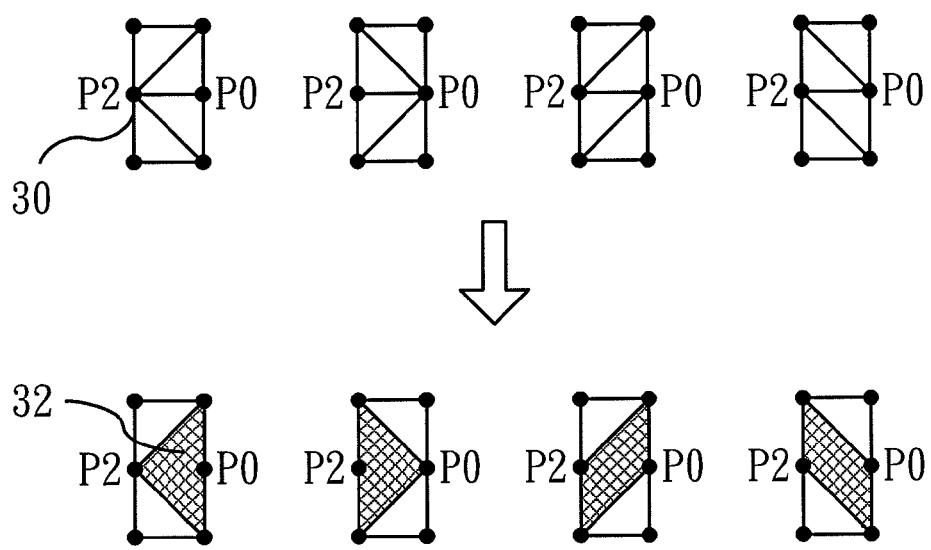
FIG. 3(b) is a diagram that the resolution image is divided into vertical blocks and vertical pixel fields are formed.

Subsequently, referring to FIG. 3(b), the resolution image layer that the sharpened filter has already performed the gradient horizontal analysis is divided into a plurality of 2×2 vertical blocks 30 and a plurality of vertical pixel fields 32 are formed through utilizing the diagonal lines 14, such that the 2×2 vertical blocks 30 becomes 3×2 vertical blocks 30. After forming the vertical pixel fields 32, a vertical gradient analysis is performed in the vertical pixel fields 32. Otherwise, each of the vertical pixel fields 32, similar to the case of each of the horizontal pixel fields 22, also has a center pixel point P0 and a relative pixel point P2, and the vertical pixel fields is in a triangular or quadrilateral shape based on the different slopes of the diagonal lines.

After the horizontal and vertical gradient analyses of the resolution image layer 10 is performed to decrease the unbalance boundary and then to generate a sharpened image layer, the sharpened image layer is interpolated by an interpolation filter for raising the resolution. The interpolation filter computes the center pixel points P0 and the relative pixel points P2 in the horizontal pixel fields 22 and the vertical pixel fields 30 to interpolate the pixels and then to generate a high resolution image layer.

Through the above mentioned embodiment of the present invention, an image layer transferred from an image is processed through the image process procedures, such as a filter process, a gradient analysis and a resolution enhancement so as to enhance the image boundaries resolution and lower the image blurring degree image. Also, the computing complexity in the present invention is so low that it can be popular in many kinds of image processing device.

Those described above are only the preferred embodiments to clarify the technical contents and characteristic of the present invention in enabling the persons skilled in the art to understand, make and use the present invention. However, they are not intended to limit the scope of the present invention. Any modification and variation according to the spirit of the present invention can also be included within the scope of the claims of the present invention.

What is claimed is:

1. An image processing method for boundary resolution enhancement, the method comprising:
   transferring an image into an image layer;
   applying a bilateral filter to the image layer to generate a resolution image layer;
   applying a sharpness filter to the resolution image layer to remove at least one unbalance boundary of the resolution image layer and to generate a sharpened image layer; and
   generating a high resolution image layer by interpolating the sharpened image layer using an interpolation filter.

2. The method of claim 1, wherein applying the bilateral filter removes noise from the image layer.

3. The method of claim 1, wherein the bilateral filter is an Inverted Intensity Gaussian Bilateral Filter (IIG bilateral filter).

4. The method of claim 1, further comprising:
   transferring a format of the high resolution image layer into an original format of the image.

5. The method of claim 1, wherein the image layer transferred from the image comprises an RGB format, an YUV format, or a CIE-Lab format.

6. The method of claim 1, wherein the step of applying the sharpness filter to the resolution image layer includes dividing pixels of the resolution layer by Data Dependent Triangulation and wherein each of the pixels has a diagonal line.

7. The method of claim 6, wherein the resolution image layer is divided into a plurality of horizontal blocks; a horizontal pixel field is formed along the diagonal lines in each of the horizontal blocks; and the horizontal pixel field is generated by the application of the sharpness filter.

8. The method of claim 7, wherein the interpolation filter computes center pixels in the horizontal pixel fields and opponent pixels relative to the center pixels to generate interpolated pixels for interpolating the sharpened image layer using the interpolation filter.

9. The method of claim 6, wherein the resolution image layer is divided into a plurality of vertical blocks; a vertical pixel field is formed along the diagonal lines in each of the vertical blocks; and the vertical pixel field is generated by the sharpness filter.

10. The method of claim 9, wherein the interpolation computes center pixels in the vertical pixel fields and opponent pixels relative to the center pixels to generate interpolated pixels for interpolating the sharpened image layer using the interpolation filter.

11. The method of claim 1, wherein the sharpness filter is a high pass sharpness filter.

12. A non-transitory computer-readable storage medium storing instructions, which, when executed on a processor, performs an operation for boundary resolution enhancement, the operation comprising:
   transferring an image into an image layer;
   removing noise of the image layer by using a bilateral filter to the image layer to generate a resolution image layer; and
   performing a gradient analysis of the resolution image layer by using a sharpness filter to remove at least one unbalance boundary of the resolution image layer and then to generate a sharpened image layer, and interpolating the sharpened image layer by using an interpolation filter to generate a high resolution image layer.

13. The computer-readable storage medium of claim 12, wherein the operation further comprises:
   transferring a format of the high resolution image layer into an original format of the image.

14. The computer-readable storage medium of claim 12, wherein the bilateral filter is an Inverted Intensity Gaussian Bilateral Filter (IIG bilateral filter).

15. The computer-readable storage medium of claim 12, wherein image layer transferred from the image comprises an RGB format, an YUV format or a CIE-Lab format.

16. The computer-readable storage medium of claim 12, wherein in the step of sharpening the resolution layer by the sharpness filter, pixels of the resolution layer are divided by Data Dependent Triangulation and each of the pixels has a diagonal line.

17. A system, comprising:
   a processor; and
   a memory hosting an application, which, when executed on the processor, performs an operation for boundary resolution enhancement, the operation comprising:
      transferring an image into an image layer,
      removing noise of the image layer by using a bilateral filter to the image layer to generate a resolution image layer, and
      performing a gradient analysis of the resolution image layer by using a sharpness filter to remove at least one unbalance boundary of the resolution image layer and then to generate a sharpened image layer, and interpolating the sharpened image layer by using an interpolation filter to generate a high resolution image layer.

18. The system of claim 17, wherein the operation further comprises:

transferring a format of the high resolution image layer into an original format of the image.

19. The system of claim 17, wherein the bilateral filter is an Inverted Intensity Gaussian Bilateral Filter (IIG bilateral filter).

20. The system of claim 17, wherein image layer transferred from the image comprises an RGB format, an YUV format or a CIE-Lab format.

21. The system of claim 17, wherein in the step of sharpening the resolution layer by the sharpness filter, pixels of the resolution layer are divided by Data Dependent Triangulation and each of the pixels has a diagonal line.

* * * * *